(12) United States Patent
Chen et al.

(10) Patent No.: US 10,437,993 B2
(45) Date of Patent: Oct. 8, 2019

(54) METHODS, SYSTEMS, AND COMPUTER READABLE MEDIA FOR DETECTING COVERT TIMING CHANNELS

(71) Applicants: The Trustees of the University of Pennsylvania, Philadelphia, PA (US); Georgetown University, Washington, DC (US)

(72) Inventors: Ang Chen, Philadelphia, PA (US); Hanjun Xiao, Philadelphia, PA (US); William Bradley Moore, Washington, DC (US); Andreas Haeberlen, Philadelphia, PA (US); Linh Thi Xuan Phan, Philadelphia, PA (US); Micah Sherr, Silver Spring, MD (US); Wenchao Zhou, Vienna, VA (US)

(73) Assignees: THE TRUSTEES OF THE UNIVERSITY OF PENNSYLVANIA, Philadelphia, PA (US); GEORGETOWN UNIVERSITY, Washington, DC (US)

( * ) Notice: Subject to any disclaimer, the term of this patent is extended or adjusted under 35 U.S.C. 154(b) by 88 days.

(21) Appl. No.: 15/514,820

(22) PCT Filed: Oct. 5, 2015

(86) PCT No.: PCT/US2015/054088
§ 371 (c)(1),
(2) Date: Mar. 27, 2017

(87) PCT Pub. No.: WO2016/108980
PCT Pub. Date: Jul. 7, 2016

(65) Prior Publication Data
US 2017/0213028 A1    Jul. 27, 2017

Related U.S. Application Data

(60) Provisional application No. 62/059,503, filed on Oct. 3, 2014.

(51) Int. Cl.
G06F 21/55    (2013.01)
G06F 21/75    (2013.01)
(Continued)

(52) U.S. Cl.
CPC ........ G06F 21/556 (2013.01); G06F 9/45558 (2013.01); G06F 21/12 (2013.01);
(Continued)

(58) Field of Classification Search
CPC .... G06F 21/556; G06F 21/577; G06F 21/552; G06F 11/30; G06F 11/3058;
(Continued)

(56) References Cited

U.S. PATENT DOCUMENTS 9,009,385 B1 *   4/2015  Juels ............... G06F 3/0622
                                          711/130
9,436,603 B1 *   9/2016  Pohlack ........... G06F 21/556
(Continued)

OTHER PUBLICATIONS

Notification of Transmittal of the International Search Report and the Written Opinion of the International Searching Authority, or the Declaration for International Application No. PCT/US2015/054088 (dated Jul. 12, 2016).

(Continued)

Primary Examiner — Tae K Kim
(74) Attorney, Agent, or Firm — Jenkins, Wilson, Taylor & Hunt, P.A.

(57) ABSTRACT

A mechanism called time-deterministic replay (TOR) that can reproduce the execution of a program, including its precise timing. Without TOR, reproducing the timing of an execution is difficult because there are many sources of timing variability. TOR uses a combination of techniques to either mitigate or eliminate most of these sources of variability. Using a prototype implementation of TOR in a Java Virtual Machine, we show it is possible to reproduce the timing to within 1.85% of the original execution. A study of one of the applications of TOR is described: the detection of
(Continued)

TIMED CORE AND SUPPORT CORE DURING PLAY a covert timing channel. Timing channels can be used to exfiltrate information from a compromised machine by subtly varying timing of the machine's outputs, TOR can detect this variation. Unlike prior solutions, which generally look for a specific type of timing channel, our approach can detect a wide variety of channels with high accuracy.

23 Claims, 6 Drawing Sheets

(51) Int. Cl.
    *G06F 21/12*     (2013.01)
    *G06F 21/53*     (2013.01)
    *G06F 9/455*     (2018.01)

(52) U.S. Cl.
    CPC .............. *G06F 21/53* (2013.01); *G06F 21/75* (2013.01); *G06F 2009/45587* (2013.01); *G06F 2221/033* (2013.01); *G06F 2221/2151* (2013.01)

(58) Field of Classification Search
    CPC .. G06F 11/3409; G06F 21/554; G06F 21/566; G06F 21/71; G06F 21/74; G06F 21/75; G06F 21/755
    See application file for complete search history.

(56) References Cited

U.S. PATENT DOCUMENTS

| | | | |
|---|---|---|---|
| 9,887,833 B2* | 2/2018 | Sethumadhavan | ... G06F 21/556 |
| 2008/0072323 A1* | 3/2008 | Yu | ......................... G06F 21/556 726/22 |
| 2009/0158430 A1* | 6/2009 | Borders | ................. G06F 21/552 726/23 |
| 2010/0251031 A1* | 9/2010 | Nieh | .................... G06F 11/3419 714/45 |
| 2012/0215881 A1 | 8/2012 | Beckwith et al. | |
| 2013/0188652 A1 | 7/2013 | Beshai et al. | |
| 2014/0047237 A1 | 2/2014 | Parrish | |
| 2014/0123139 A1* | 5/2014 | Fine | .................... G06F 9/45533 718/1 |
| 2014/0259161 A1* | 9/2014 | Kastner | ................. G06F 21/556 726/22 |
| 2016/0044059 A1* | 2/2016 | Fine | .................... H04L 63/1416 726/23 |
| 2017/0154181 A1* | 6/2017 | Venkataramani | ..... G06F 21/556 |

OTHER PUBLICATIONS

Agat, "Transforming out Tming Leaks," Proc. POPL, pp. 1-14 (Jan. 19-21, 2000).
Alpern et al., "DejaVu: Deterministic Java Replay Debugger for Jalapeno Java Virtual Machine," OOPSLA Addendum, pp. 1-2 (Oct. 2000).
Altekar et al., "ODR: Output-Deterministic Replay for Multicore Debugging," Proc. SOSP, pp. 1-14 (Oct. 11-14, 2009).
Arimoto, "An Algorithm for Computing the Capacity of Arbitrary Discrete Memoryless channels," IEEE Trans. Inf. Theor., vol. 18, No. 1, pp. 14-20 (Jan. 1972).
Askarov et al., "Predictive Black-Box Mitigation of Timing Channels," Proc. CCS, pp. 1-12 (Oct. 4-8, 2010).
Aviram et al., "Efficient System-Enforced Deterministic Parallelism," Proc. OSDI, pp. 1-14 (Oct. 2010).
Axer et al., "Building Timing Predictable Embedded Systems," ACM TECS, vol. 13, No. 4, Article 82, pp. 82:1-82:37 (Feb. 2014).
Bergan et al., "CoreDet: A Compiler and Runtime System for Deterministic Multithreaded Execution," Proc. ASPLOS, pp. 1-12 (Mar. 13-17, 2010).
Bergan et al., "Deterministic Process Groups in dOS," Proc. OSDI, pp. 1-15 (Oct. 2010).
Berger et al., "Grace: Safe Multithreaded Programming for C/C++," Proc. OOPSLA, pp. 1-16 (Oct. 25-29, 2009).
Berk et al., "Detection of Covert Channel Encoding in Network Packet Delays," Technical report TR2005-536, Dartmouth College, Hanover, NH, pp. 1-10 (Aug. 2005).
Blahut, "Computation of Channel Capacity and Rate-Distortion Functions," IEEE Trans. Inf. Theory., vol. 18, No. 4, pp. 460-473 (Jul. 1972).
Burtsev, "Xen Deterministic Time-Travel," HomePage, accessed through wayback machine, https://web.archive.org/web/20141006214816/http://www.cs.utah.edu:80/~aburtsev/xen-tt-doc/, pp. 1-2 (Oct. 6, 2014).
Cabuk, "Network Covert Channels: Design, Analysis, Detection, and Elimination," PhD thesis, Purdue Univ., pp. 1-111 (Dec. 6, 2006).
Cabuk et al., "IP Covert Timing Channels: Design and Detection," Proc. CCS, pp. 178-187 (Oct. 25-29, 2004).
Choi et al, "Deterministic Replay of Java Multithreaded Applications," Proc. SPDT, pp. 1-12 (Aug. 1998).
Devietti et al., "DMP: Deterministic Shared Memory Multiprocessing," Proc. ASPLOS, pp. 1-12 (Mar. 7-11, 2009).
Dischinger et al., "Characterizing Residential Broadband Networks," Proc. IMC, pp. 1-14 (Oct. 24-26, 2007).
Dunlap et al., "ReVirt: Enabling Intrusion Analysis through Virtual-Machine Logging and Replay," Proc. OSDI, pp. 1-14 (Dec. 2002).
Dunlap et al., "Execution Replay for Multiprocessor Virtual Machines," Proc. VEE, pp. 1-10 (Mar. 5-7, 2008).
Edwards et al., "The Case for the Precision Timed (PRET) Machine," Proc. DAC, pp. 1-2 (Jun. 4-8, 2007).
Gianvecchio et al., "Detecting Covert Timing Channels: An Entropy-Based Approach," Proc. CCS, pp. 1-10 (Oct. 27- Nov. 2, 2007).
Gianvecchio et al., "An Entropy-Based Approach to Detecting Covert Timing Channels," IEEE Transactions on Dependable and Secure Computing, vol. 8, Issue 6, pp. 1-15 (Nov. 2011).
Gianvecchio et al., "Model-Based Covert Timing Channels: Automated Modeling and Evasion," Proc. RAID, pp. 1-21 (Sep. 2008).
Haeberlen et al., "PeerReview: Practical Accountability for Distributed Systems," Proc. SOSP, pp. 1-14 (Oct. 14-17, 2007).
Haeberlen et al., "Accountable Virtual Machines," Proc. OSDI, pp. 1-16 (Oct. 2010).
Hower et al., "Calvin: Deterministic or Not? Free Will to Choose," Proc. HPCA, pp. 1-12 (2011).
Hu, "Reducing Timing Channels with Fuzzy Time," In IEEE Symposium on Security and Privacy, pp. 8-20 (May 20-22, 1991).
Ip et al., "A Processor Extension for Cycle-Accurate Real-Time Software," Proc. EUC, pp. 1-10 (Aug. 2006).
Kang et al., "A Network Pump," IEEE Trans. Softw. Eng., vol. 22, No. 5, pp. 329-338 (May 1996).
Lampson, "A Note on the Confinement Problem," Communications of the ACM, vol. 16, Issue 10, pp. 1-5 (Oct. 1973).
Li et al., "Mitigating Access-Driven Timing Channels in Clouds using StopWatch," Proc. DSN, pp. 1-12 (Jun. 2013).
Liedtke et al., "OS-Controlled Cache Predictability for Real-time Systems," Proc. RTAS, pp. 1-11 (Jun. 9-11, 1997).
Liu et al., "Real-time Covert Timing Channel Detection in Networked Virtual Environments," Proc. International Conference on Digital Forensics, pp. 273-288 (Jan. 2013).
Liu et al., "A PRET Microarchitecture Implementation with Repeatable Timing and Competitive Performance," Proc. ICCD, pp. 1-7 (Sep. 2012).
Liu et al., "Dthreads: Efficient Deterministic Multithreading," Proc, SOSP, pp. 1-14 (Oct. 2011).
Nfsj, "A Java NFS server, with Android bindings," https://code.google.com/p/nfsj/, pp. 1 (Apr. 18, 2011).
Olszewskiet al., "Kendo: Efficient Deterministic Multithreading in Software," Proc. ASPLOS, pp. 1-12 (Mar. 7-11, 2009).
Park et al., "PRES: Probabilistic Replay with Execution Sketching on Multiprocessors," Proc. SOSP, pp. 1-15 (Oct. 11-14, 2009).
Peng et al., "On the Secrecy of Timing-Based Active Watermarking Trace-Back Techniques," Proc. IEEE Security and Privacy, pp. 1-15 (May 2006).

(56) References Cited

OTHER PUBLICATIONS

Pokam et al., "QuickRec: Prototyping an Intel Architecture Extension for Record and Replay of Multithreaded Programs," Proc. ISCA, pp. 1-12 (Jun. 2013).
Pozo et al., "SciMark 2.0," pp. 1-2, http://math.nist.gov/scimark2/, pp. 1-2 (Mar. 31, 2004).
Reineke et al., "Pret DRAM Controller: Bank Privatization for Predictability and Temporal Isolation," Proc. CODES+ISSS, pp. 1-10 (Oct. 9-14, 2011).
Schoeberl, "A Java Processor Architecture for Embedded Real-Time Systems," J. Syst. Archit., vol. 54, pp. 1-20 (Jun. 12, 2007).
Shah et al., "Keyboards and Covert Channels," Proc. USENIX Security, pp. 59-75 (Jul. 2006).
Wang et al., "Robust Correlation of Encrypted Attack Traffic Through Tepping Stones by Manipulation of Interpacket Delays," Proc. CCS, pp. 1-10 (Oct. 27-30, 2003).
Wang et al., "Tracking Anonymous Peer-to-Peer VoIP calls on the Internet," Proc. CCS, pp. 1-11 (Nov. 7-11, 2005).
Whitham et al., "MCGREP—A Predictable Architecture for Embedded Real-time Systems," Proc. RTSS, pp. 1-12 (Dec. 2006).
Wilhelm, "Determining Bounds on Execution Times," Handbook on Embedded Syst. CRC Press, pp. 1-33 (2005).
Wilhelm et al., "The Worst-Case Execution-Time Problem-Overview of Methods and Survey of Tools," ACM TECS, vol. 7, No. 3, Article 36, pp. 36:1-36:53 (May 2008).
Wu et al., "Worst Case Analysis of DRAM Latency in Multi-Requestor Systems," Proc. RTSS, pp. 372-383 (Dec. 2013).
Xu et al., "ReTrace: Collecting Execution Trace with Virtual Machine Deterministic Replay," Proc. MoBS, pp. 1-8 (Jun. 2007).
Yang et al., "ORDER: Object centRic DEterministic Replay for Java," Proc. USENIXATC, pp. 1-14 (Jun. 2011).

\* cited by examiner

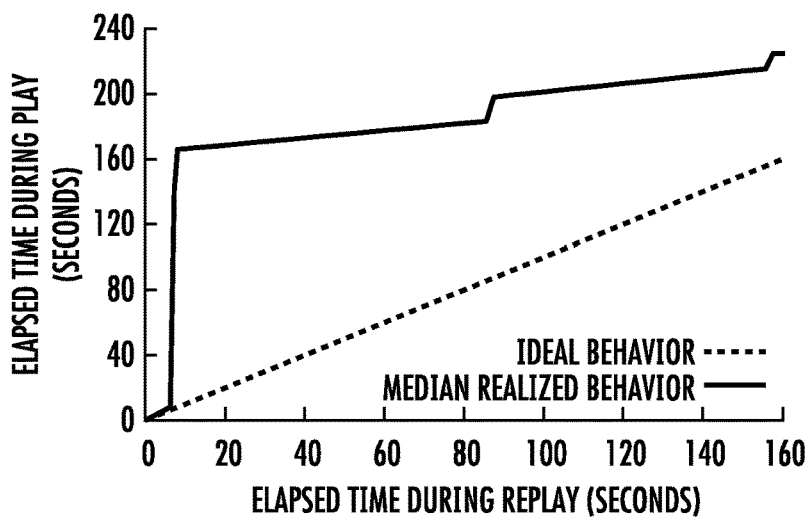
FIG. 3
```
VOID ACCESSINT (INT *VALUE, INT *BUF) {
  INT TEMP = (*VALUE) & PLAYMASK;
  TEMP = TEMP | (*BUF & ~PLAYMASK);
  *VALUE = *BUF = TEMP;
}
```
FIG. 4
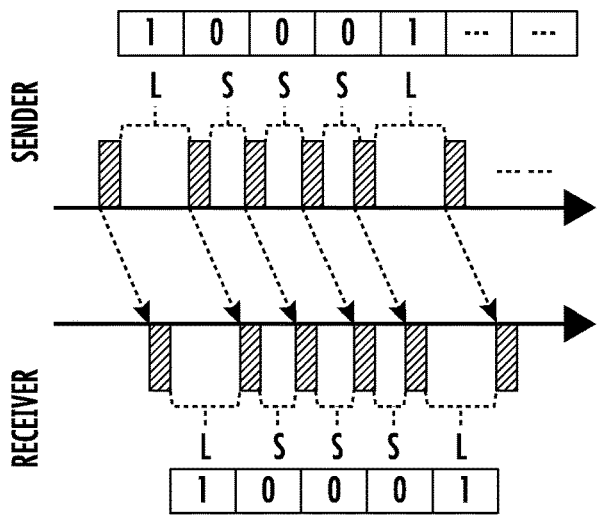
FIG. 5

TIMED CORE AND SUPPORT CORE DURING PLAY

TIMED CORE AND SUPPORT CORE DURING PLAY

METHODS, SYSTEMS, AND COMPUTER READABLE MEDIA FOR DETECTING COVERT TIMING CHANNELS

PRIORITY CLAIM

This application claims the benefit of U.S. Provisional Application Ser. No. 62/059,503, filed Oct. 3, 2014, the disclosure of which is incorporated herein by reference in its entirety.

GOVERNMENT INTEREST

This invention was made with government support under Grant Nos. CNS-1065130, CNS-1054229, CNS-1149832, CNS-1064986, CNS-1117185, CNS-1040672 awarded by the National Science Foundation, and Grant No. FA8650-11-C-7189 awarded by the Defense Advanced Research Projects Agency. The government has certain rights in the invention.

TECHNICAL FIELD

The subject matter described herein relates to detecting covert timing channels with time-deterministic replay.

BACKGROUND

Covert timing channels are a mechanism by which secret or confidential information can be coded in the output of computer software. For example, a covert timing channel can encode secret information in the timing between messages output by a computer program. In one example of a covert timing channel, messages that are close in time to each other may indicate a binary 1 and the absence of messages for a predetermined time period may indicate a binary 0.

Some existing methods for detecting covert timing channels search for patterns in software output to detect the presence of a covert timing channel. However, because such patterns are easily changeable, covert pattern detection methods must also change as new covert timing channel patterns emerge. As a result, pattern based covert timing channel detectors must be periodically updated as new covert timing channel patterns are discovered. This cycle of discovering new patterns and updating covert timing channel pattern detection software is undesirable as pattern detectors will always be behind new covert timing pattern generators.

Accordingly, there exists a need for improved, methods, systems, and computer readable media for detecting covert timing channels.

SUMMARY

The subject matter described herein includes methods, systems, and computer readable media for time deterministic replay and for detecting covert timing channels using time deterministic replay. One method for detecting covert timing channels using time deterministic replay includes recording inputs, timings of the inputs, outputs, and timings of outputs of a play execution of software S. The method further includes using the inputs and the timings of the inputs from the play execution to perform a replay execution of a reference copy of software S and recording outputs and timings of outputs the replay execution. The method further includes comparing the timings of the outputs of the play execution to the timings of outputs of the replay execution to determine whether the output of the play execution contains a covert timing channel.

The subject matter described herein for time deterministic replay and for detecting covert timing channels using time deterministic replay may execute on a computing platform and when executed transforms the computing platform into a special purpose computer that improves the technological field of detecting covert timing channels. The subject matter described herein also includes the technological field of time deterministic execution of computer software so that different executions of the same software can be compared in a like manner.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 is a graph illustrating variability in timing between play and replay executions in existing virtual machine monitors (VMMs).

FIG. 4 is a diagram illustrating an algorithm for symmetric reads and writes.

FIG. 5 is a diagram illustrating an example of a covert timing channel that encodes the bit stream 10001.

DETAILED DESCRIPTION

1 Introduction

Figures 1A, 1B:
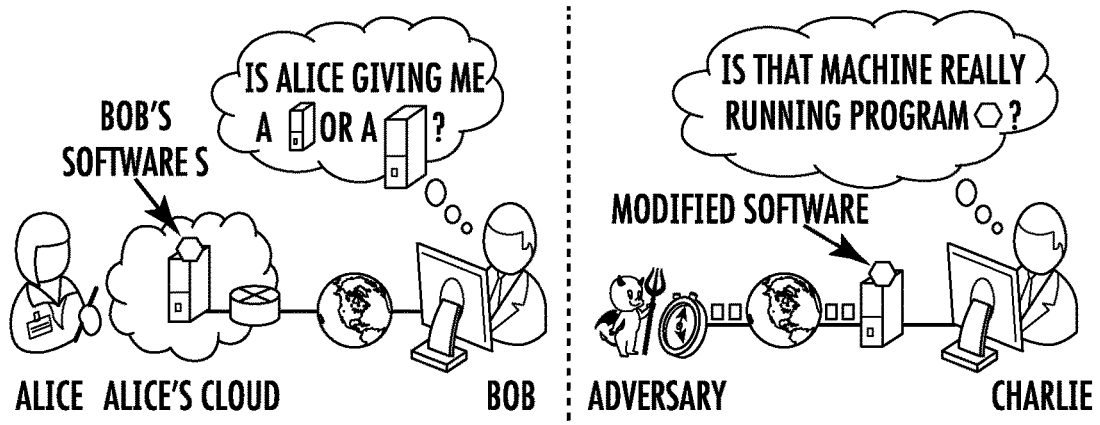
FIGS. 1A and 1B are diagrams illustrating to scenarios that benefit from time deterministic replay (TDR): A) Bob wishes to verify that his software is running on the expected type of machine in Alice's cloud, and B) Charlie wishes to verify that his machine is correctly executing his program.

When running software on a remote machine, it is common for users to care not only about the correctness of the results, but also about the time at which they arrive. Suppose, for instance, that Bob is a customer of a cloud computing platform that is run by Alice, and suppose Alice offers several machine types with different speeds, for which she charges different prices. If Bob chooses one of the faster machines to run his software but finds that the results arrive later than expected, he might wish to verify whether he is getting the service he is paying for. Conversely, if an angry Bob calls Alice's service hotline to complain, Alice might wish to convince Bob that he is in fact getting the promised service, and that the low performance is due to Bob's software.

A closely related problem has been studied in computer security. Suppose Charlie is a system administrator, and suppose one of his machines has been compromised by an adversary who wants to exfiltrate some data from the machine without raising Charlie's suspicion. In this case, the adversary might create a covert timing channel [31]—that is, he might cause the machine to subtly vary the timing of the network messages it sends, based on the data it is supposed to leak. As in the previous scenario, the outputs of the machine (in this case, the transmitted messages) are perfectly correct; the problem can only be detected by looking at the timing.

Although the two problems appear very different at first, they are in fact both instances of a more fundamental problem: checking whether the timing of a sequence of outputs from a machine M is consistent with an execution of some particular software S on M. The difference is in the part of the system that is being questioned. In the first scenario, it is the machine M: Bob suspects that Alice has given him a slower machine than the one he is paying for. In the second scenario, it is the software S: Charlie suspects that the adversary may have tampered with the software to vary the timing of the outputs. Thus, a solution for the underlying problem could benefit both of the scenarios we have motivated.

One possible approach would be to try to infer the "correct" timing of running the software S on the machine M, e.g., by carefully analyzing the timing of the various subroutines of S. But there are many factors that can affect the timing of a program's execution—cache effects, hardware interrupts, inputs at runtime, preemptions by the kernel or by other programs, I/O latencies, and many more—and their combined effect is extremely difficult to predict. Even inferring an upper bound can be very difficult, as the extensive literature on worst-case execution time (WCET) analysis [50] in the real-time systems domain can attest— and even an excellent WCET would still not be sufficient to solve our problem because we would need to know the specific runtime, not just an upper bound.

As described below, we explore an alternative approach to this problem. One exemplary insight of the subject matter described herein is that it is not necessary to predict the timing of S on M in advance—it is sufficient to reproduce the timing after the fact. If Bob had access to another machine M' of the same type and could reproduce the precise timing of S on that machine, he could simply compare the timing of the outputs during the reproduced execution to the timing of the messages he actually observed. If M was of the correct type and was indeed running S, the two should be identical; if they are not, either M must have had a different type, or S must have been modified or compromised. The potential advantage of this approach is that there is no need to analytically understand the complex timing behavior of, e.g., caches or interrupt handlers: if the two executions unfold in exactly the same way, the cache contents during the executions should be very similar as well.

Deterministic replay [19] provides a partial solution in that it can reproduce the functional behavior of a program by carefully recording all nondeterministic events (such as external inputs or random decisions) in a log, and by replaying the exact same events during replay. This ensures that the program produces the same outputs in the same order. However, it is not sufficient to reproduce the program's temporal behavior: as we will show experimentally, the replayed execution can take substantially more—or less—time than the original execution, and the outputs can appear at very different points in both executions. There are two key reasons for this. First, existing replay systems reproduce only factors that control a program's control or data flow; they do not reproduce factors that affect timing because the latter is not necessary for functional replay. Second, and more fundamentally, play and replay involve very different operations (e.g., writing vs. reading, and capturing vs. injecting) that have different timing behavior, and these differences affect the program's overall timing.

We propose to address these challenges using a mechanism we call time-deterministic replay (TDR). A TDR system naturally provides deterministic replay, but it additionally reproduces events that have nondeterministic timing, and it carefully aligns its own operations during play and replay so that they affect the program's timing in a similar way. On an ideal TDR implementation, replay would take exactly the same time as play, but in practice, TDR is limited by the presence of time noise on the platform on which it runs: for instance, many CPUs speculatively execute instructions, and we do not know a way to reproduce this behavior exactly. Nevertheless, we show that it is possible to mitigate or eliminate many large sources of time noise, and that the timing of complex programs can be reliably reproduced on a commodity machine with an error of 1.85% or less.

We also describe the design of Sanity[1], a practical TDR system for the Java Virtual Machine, and we show how Sanity can be used in one of our target applications: the detection of covert timing channels. Detecting such channels is known to be a hard problem that has been studied for years. The best known solutions [15, 22, 23, 40] work by inspecting some high-level statistic (such as the entropy) of the network traffic, and by looking for specific patterns; thus, it is not difficult for an adversary to circumvent them by varying the timing in a slightly different way. To our knowledge, TDR offers the first truly general approach: it can in principle detect timing modifications to even a single packet, and it does not require prior knowledge of the encoding that the adversary will use. In summary, we make the following five contributions:

[1] The name Sanity is a play on the definition of insanity, often attributed to Albert Einstein, as the exact repetition of a process while expecting a different outcome.

- The TDR concept itself (Section 2);
- The design of Sanity, a system that provides TDR for the Java Virtual Machine (Section 3);
- A prototype implementation of Sanity (Section 4);
- An application of TDR to the detection of covert timing channels (Section 5); and
- An experimental evaluation of Sanity (Section 6).

2 Overview

In this section, we give a more precise problem statement, and we explain some of the key challenges.

2.1 Problem Statement

FIGS. 1A and 1B illustrate two variants of the scenario described herein. In the variant in FIG. 1(A), Alice has promised Bob that she would run some software S on a (virtual or physical) machine of type T; Bob can connect to S over the network, but he does not have physical access to it. (This scenario commonly occurs on today's cloud platforms.) If the performance of S does not meet Bob's expectations, Bob might wonder whether Alice has really provisioned a machine of type T, or perhaps a less powerful type T'.

FIG. 1B shows a different variant in which Charlie runs S on a machine he controls directly. Even if S appears to be working normally, Charlie might wonder whether the machine has been compromised by a remote adversary who has altered S and is now trying to leak secrets over the network by subtly altering the timing of the messages S sends. The key difference to the first scenario is that the machine is known to be of type T (perhaps Charlie can physically inspect it), and that Charlie is questioning the integrity of S instead.

In both scenarios, it seems reasonable to assume that Bob and Charlie have a way to observe the messages $m_1$, $m_2$ ... that S sends and receives, as well as the approximate transmission or arrival time $t_1, t_2$ ... of each message. The problem, then, is to decide whether a sequence $(m_i, t_i)$ of messages and message timings is consistent with an execution of a software S on a machine of type T.

2.2 Why Not Use Prediction?

If Bob and Charlie had a way to precisely predict how long an execution of S on T was going to take, they could solve the problem simply by comparing the observed message timings $t_i$ to his predictions. However, the execution time depends on an enormous number of factors, such as the inputs the program receives, the state of the CPU's caches and TLBs, the number of hardware interrupts, the scheduling decisions of the kernel, and the duration of I/O operations, to name just a few. Because of this, predicting the execution time of any nontrivial program is known to be extremely difficult.

This problem has been extensively studied in the real-time systems community, and a variety of powerful timing analyses are now available (cf. [7] and [50] for an overview). But these analyses typically produce bounds—the worst-case execution time (WCET) and the best-case execution time (BCET)—and not the exact execution time. Moreover, the WCET (BCET) is typically much higher (lower) than the actual execution time [49]. Such bounds are useful if the goal is to guarantee timeliness, i.e., the execution completes before a particular point in time; however, it is usually not precise enough for the problem we consider here.

2.3 Approach: Reproducible Timing

The solution described herein is based on the insight that it is not actually necessary to predict a priori how long an execution of S on T is going to take—it would be sufficient to reproduce the timing of an execution after the fact. This is a much easier problem because it does not require an analysis of the many complex factors that could affect the execution time; we "merely" need to ensure that these factors affect the reproduced execution in the same way. For instance, to predict the impact of the caches on the execution time, it would be necessary to predict the exact sequence of memory accesses that S is going to perform; to reproduce the impact, we can simply reproduce the same sequence of memory accesses.

Reproducible timing would solve the problem from Section 2.1 because it would enable a form of auditing: if Bob and Charlie locally have another machine of type T available, they can reproduce the execution of S on that machine and compare the timing to the timing they have observed on the remote machine. If the two are similar, this suggests that the remote machine is indeed of type T; if the timings are dissimilar, this is evidence that the machine is of a different type, or that it is not running the unmodified software S.

2.4 Challenge #1: Time Noise

To highlight some of the key challenges of reproducible timing, we first consider two simple strawman solutions. The first is to simply reproduce the remote execution using deterministic replay, i.e., to ask the remote machine to record all nondeterministic inputs (such as messages, interrupts, etc.) along with the precise point in the program where each of them occurred, and to inject these inputs at the same points during replay. Deterministic replay is a well-established technique for which several mature solutions exist [3, 13, 19, 20, 39, 52, 53].

Figure 2:
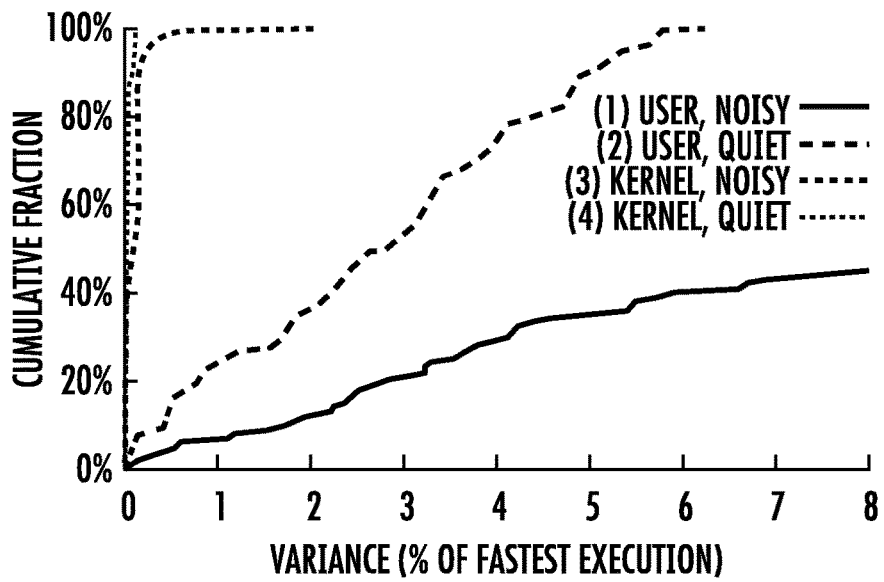
FIG. 2 is a graph illustrating timing variance of a simple program that zeros out a 4 MB array, in four different execution scenarios.

However, although this approach faithfully reproduces the control flow and the outputs of the original execution, it usually does not reproduce the timing. To illustrate this, we performed a simple experiment in which we measured the time it took to zero out a 4 MB array. FIG. 2 shows a cumulative distribution function (CDF) of the completion times, normalized to the fastest time we observed. We show results for four different scenarios: (1) user level with GUI and network turned on; (2) user level in single-user mode, running from a RAM disk; (3) kernel mode; and (4) kernel mode with IRQ turned off, cache flushed, TLB flushed, and execution pinned to a specific core. Ideally, all the executions would take the same amount of time and thus have a variance of zero, but in practice, some take considerably more time than others—the largest variance we observed was 189% in scenario (1), which corresponds to nearly 3× the time of the fastest execution in that scenario. Because of this variability, which we will refer to herein as time noise, it is extremely difficult to compare the timing of different executions, even for very simple programs.

However, FIG. 2 also contains a hopeful message: as the environment becomes more and more controlled, the timing becomes more and more consistent. Hence, one aspect of the subject matter described herein includes identifying and removing sources of time noise. If there were a way to completely eliminate all sources, the timing of the original and the repeated execution would be identical.

Where does the time noise come from? Commodity hardware and software have not been designed with repeatable timing in mind, and therefore contain many sources of time noise, including:

Memory: Different memory accesses during play and replay and/or different memory layouts can increase or decrease the number of cache misses at all levels, and/or affect their timing;

CPU: The processor can speculatively execute instructions or prefetch data, e.g., based on branch target predictions;

I/O: Input/output operations can take a variable amount of time, particularly when HDDs are involved (due to seek/rotational latency);

IRQs: Interrupts can occur at different points in the program; the handlers can cause delays and displace part of the working set from the cache; and Kernel/VMM: The kernel can preempt the program to schedule other tasks, or to take care of internal housekeeping. Also, system calls can take a variable amount of time.

Some of these sources can be completely eliminated; others can at least be considerably reduced by carefully designing the kernel or VMM. For instance, we can eliminate the variability from the address space layout by giving the program the same physical frames during play and replay, and we can reduce the interference from hardware interrupts by enabling them only at certain points in the execution.

2.5 Challenge #2: Play/Replay Asymmetry

Even if the timing of the program and the underlying hardware were completely deterministic, there is still a need to record its inputs so that its execution can be reproduced on another machine. This gives rise to another challenge: record and replay are fundamentally different operations that typically involve different code, different I/O operations, and different memory accesses. Thus, they will typically affect the timing in a different way.

To illustrate this point, we performed the following simple experiment. We recorded the execution of a simple Linux VM using XenTT [13], a replay-enabled variant of the Xen hypervisor, and we directed some web requests towards an HTTP server that was running in the VM. To get a sense of the timing of the events in the VM, we instrumented XenTT to also record, for each event e, the wall-clock time $T_p(e)$. We then replayed the log and measured, for each event e, the wall-clock time $T_r(e)$ at which e was replayed. By comparing $T_p$ and $T_r$, we can get a sense of the relative speed of play and replay.

FIG. 3 shows a plot in which $T_p$ is on the vertical axis and $T_r$ on the horizontal axis; each point represents one event in the log. With fully time-deterministic replay, this graph would show a straight line, but the actual graph is far from it. There are some phases in which replay is faster than play, e.g., the interval from $T_p(e)=183$ to $T_p(e)=196$, in which the VMM was waiting for inputs; XenTT simply skips this phase during replay. In other phases, play is faster than replay, e.g., during the kernel boot phase, when Linux calibrates its internal clock.

This simple experiment shows that, to achieve repeatable timing, removing sources of time noise is not enough—the VMM also needs to "balance" play and replay in such a way that they affect the timing in approximately the same way.

3 Sanity Design

In this section, we describe the design of Sanity, a virtual-machine monitor (VMM) that provides highly repeatable timing. Sanity is a clean-slate VMM design that implements the Java Virtual Machine (JVM).

TABLE 1

Sources of time noise that Sanity mitigates or eliminates, as well as the corresponding techniques.

| Noise Source | Mitigation technique(s) used | Effect | Section |
|---|---|---|---|
| Divergence | Deterministic replay [19] | Eliminated | 3.2 |
| Randomness | Avoid or log random decisions | Eliminated | 3.2 |
| Scheduler | Deterministic multithreading [38] | Eliminated | 3.2 |
| Interrupts | Handle interrupts on a separate core | Reduced | 3.3 + 3.4 |
| Play vs. replay | Align JVM's control flow and memory accesses during play and replay | Eliminated | 3.5 |
| Caches | Flush caches at the beginning; use the same physical frames | Reduced | 3.6 |
| Paging | All memory is pinned and managed by JVM | Eliminated | 3.6 |
| I/O | Pad variable-time operations; use SSDs instead of HDDs | Reduced | 3.7 |
| Preemption | Run in kernel mode; do not share core with other apps | Eliminated | 4.2 |
| CPU features | Disable timing-relevant CPU features, such as frequency scaling | Reduced | 4.2 |

3.1 Why a Clean-Slate Design?

It is natural to ask why we have chosen to redesign Sanity from scratch instead of simply extending one of the many excellent open-source VMM implementations that are already available. The reason is that existing implementations were not built with time-determinism in mind and thus tend to contain a variety of sources of time noise, such as randomized data structures, system calls, various types of speculation, and so on. Finding these sources would be difficult because their effects are not necessarily local: for instance, a function A might invoke a system call, and in the process of handling it, the kernel might access different memory locations, depending on its current state; this might then add cache misses to the execution of a completely different and unrelated function B that runs several milliseconds later.

By building our VMM from scratch, we gained the ability to control every aspect of its design, and to carefully avoid introducing time noise at each step along the way. Since our resources were limited, we chose the Java Virtual Machine (JVM), which is relatively simple—it has only 202 instructions, no interrupts, and does not include legacy features like the x86 string instructions—and for which there is a large amount of existing software. However, even state-of-the-art JVMs are very complex; for instance, the HotSpot JVM consists of almost 250,000 lines of code. Hence, we necessarily had to focus on the core features and omit others, such as just-in-time (JIT) compilation, which obviously limits Sanity's performance. We accept this limitation because it is not inherent: given enough time and a large enough team, it should be perfectly feasible to build a time-deterministic JIT compiler, as well as all the other features we were unable to include in our prototype.

Sanity provides deterministic replay (Section 3.2), and it includes a combination of several techniques that reduce or eliminate time noise (Sections 3.3-3.7). Table 1 provides an overview of the sources of time noise we focused on, and the technique(s) we used to mitigate or eliminate each of them.

3.2 Deterministic Replay

Our implementation of deterministic replay in Sanity relies mostly on standard techniques from other replay-enabled JVM implementations [2, 16]: during the original execution ("play"), we record all nondeterministic events in a log, and during the reproduced execution ("replay"), we inject the same events at the same points. For the JVM, this is much easier than for the x86-based replay implementations that many readers will be familiar with (e.g., ReVirt [19]). This is because the latter must record asynchronous events, such as hardware interrupts, that can strike at any point during the execution—even in the middle of CISC instructions such as rep movsb—which requires complex logic for injecting the event at exactly the same point during replay. The JVM, in contrast, does not have a notion of interrupts, and a simple global instruction counter is sufficient to identify any point in the execution.

To reduce the number of events that must be recorded, we implement a simple form of deterministic multithreading [38] in Sanity: threads are scheduled round-robin, and each runnable thread is given a deterministic condition that triggers the thread to yield control of processing resources to another thread. In one example, the deterministic condition may be a fixed budget of Java instructions the thread may execute before the thread is forced to yield control of processing resources to another thread. Since the execution of the individual threads is already deterministic, there is no need to record information about context switches in the log, since they will occur at exactly the same points during replay.

If Sanity is used for long-running services—perhaps a web server, which can run for months or even years—it is important to enable auditors to reproduce smaller segments of the execution individually. Like other deterministic replay systems, Sanity could provide check-pointing for this purpose, and thus enable the auditor to replay any segment that starts at a checkpoint.

3.3 Timed Core and Supporting Core

Although the JVM itself does not have asynchronous events, the platform on which it runs (e.g., an x86 machine) will usually have them. To prevent these events from interfering with the timing of the JVM's execution, Sanity confines them to a separate core. Thus, even though Sanity implements a single-core JVM, it requires a platform with at least two cores: a timed core (TC) that executes the JVM itself, and a supporting core (SC) that handles interrupts and I/O on the TC's behalf.

The TC-SC separation shields the TC from most effects of asynchronous events, but, on most platforms (with the exception of certain NUMAs), it cannot shield it entirely, since the two cores share the same memory bus, Even if the SC's program fits entirely into the SC cache, DMAs from devices must still traverse the memory bus, where they can sometimes compete with the TC's accesses.

3.4 Communication Between TC and SC

The TC and SC communicate by means of two in memory ring buffers: the S-T buffer and the T-S buffer. The SC receives asynchronous inputs, such as incoming network messages, and writes them to the S-T buffer; the TC inspects this buffer at regular intervals, or when an explicit read operation is invoked (such as DatagramChannel.read). Conversely, when the TC produces outputs (e.g., outgoing network messages), it writes them to the T-S buffer. The SC periodically inspects this buffer and forwards any outputs it contains.

The purpose of this arrangement is to make play and replay look identical from the perspective of the TC—in both cases, the TC reads inputs from, the S-T buffer and writes outputs to the T-S buffer. The SC, of course, acts differently during replay: it reads the inputs in the S-T buffer from the log rather than from a device, and it discards the outputs in the T-S buffer. But the control flow on the TC, which is crucial for repeatable timing, is identical. (See Section 3.5 for an important exception.)

3.5 Symmetric Read/Writes

If both the TC's sequence of memory accesses and its control flow are to be exactly the same during play and replay, there are two special cases that need to be handled. The first concerns the T-S buffer. Suppose, for instance, that the VM invokes System.nanoTime to read the current wallclock time. This event must be logged, along with the value that Sanity returns, so that the call can have the same result during replay. A naïve implementation might check a "replay flag" and then write the time to the T-S buffer if the flag is clear, and read from it if the flag is set. However, this would cause both different memory accesses (a dirty cache line during play, and a clean one during replay) and different control flow (perhaps a branch taken during play and not taken during replay, which would pollute the BTB).

To produce the exact same control flow and memory accesses during play and replay, we use the approach shown in FIG. 4 to access events in the T-S buffer. (The figure shows, as an example, how we access an integer.) playMask is a bit mask that is set to 111 ... 11 during play, and to 0 during replay. When an event occurs, Sanity invokes the algorithm with *value set to the value that would need to be recorded if this were the play phase (e.g., the current wallclock time). The algorithm then reads from the T-S buffer the data *buf that would need to be returned if this were the replay phase. It then computes the value temp to be either the former (during play) or the latter (during replay). Finally, it writes temp to the T-S buffer and returns it to the caller; the caller then proceeds with the returned value (e.g., returns it from System.nanoTime). The overall effect is that the value is written to the buffer during play and read from the buffer during replay; the memory accesses are identical, and no branches are taken.

A related case concerns the S-T buffer. When the TC checks the buffer during play and finds a new entry there (e.g., a received network packet), it must write the JVM's instruction counter to the entry as a virtual "timestamp" so it can be injected at the same point during replay. During replay, the TC must check this timestamp to avoid processing entries before the instruction counter reaches that value again. We handle this case similarly to the first one (the TC always reads, checks, and writes the timestamp), but with an additional twist: during play, the SC always adds a "fake" entry with a timestamp of infinity at the end of the buffer, so that the TC's next-entry checks will always fail. When the SC appends a new entry, it overwrites the previous "fake" entry (but adds a new one at the end), and it sets the timestamp to zero, so the TC's check is guaranteed to succeed. The TC can recognize this special value and replaces it with the current instruction count.

3.6 Initialization and Quiescence

To maximize the similarity between play and replay timing, Sanity must ensure that the machine is in the same state when the execution begins. This not only involves CPU state, but also memory contents, stable storage, and key devices.

On the TC, Sanity flushes all the caches it can control, including the data caches, the TLB, and any instruction caches. This entails a certain performance penalty be-cause the caches must all be repopulated, but recall that the caches remain enabled during the execution, so it is a one-time cost. We note that some CPUs perform cache flushes asynchronously (such as the wbinvd instruction on IA-32). To account for this, the TC adds a brief quiescence period before it begins the execution; this allows the cache flush to complete, and it can also be used to let hardware devices (such as the NIC) finish any operations that are still in progress. If the instruction stream on the TC is exactly the same and the caches have a deterministic replacement policy (such as the popular LRU), this is almost sufficient to reproduce the evolution of cache states on the TC. The missing piece is virtual memory: even if the TC has the same virtual memory layout during play and replay, the pages could still be backed by different physical frames, which could lead to different conflicts in physically-indexed caches. To prevent this, Sanity deterministically chooses the frames that will be mapped to the TC's address space, so they are the same during play and replay.

During execution, no memory pages are allocated or released on the TC; the JVM performs its own memory management via garbage collection. Garbage collection is not a source of time noise, as long as it is itself deterministic.

3.7 I/O Handling

Sanity uses the SC to perform all I/O operations. For streaming-type devices, such as the NIC or the terminal, this is relatively straightforward: whenever the TC has an output to send (such as a network packet, or a terminal output), it writes the data to the T-S buffer; whenever the SC receives an input, it writes it to the S-T buffer, which the TC checks at regular intervals.

Storage devices are more challenging because the latency between the point where the VM issues a read request and the point where the data is available can be difficult to reproduce. A common way to address this (cf. [5]) is to pad all requests to their maximal duration. This approach is expensive for HDDs because of their high rotational latency, which can be several milliseconds, but it is more practical for the increasingly common SSDs, which are roughly three orders of magnitude faster, and far more predictable.

3.8 What Sanity Does Not Do

We emphasize that Sanity does not run with caches disabled, and that it does not prevent the JVM from performing I/O or from communicating with the outside world. Although the effects of these features on execution time are hard to predict, we argue—and we will demonstrate in Section 6—that it is possible to reproduce them with relatively high accuracy, to a degree that becomes useful for interesting new applications (more about this in Section 5). Ensuring reproducibility is far from trivial, but can be accomplished with careful design choices, such as the ones we have described here.

4 Sanity Implementation

Next, we describe a prototype of Sanity that we have built for our experiments.

4.1 Java Virtual Machine

For our prototype, we implemented a Java Virtual Machine from the ground up. This includes support for the JVM's instructions, dynamic memory management, a mark-and-sweep garbage collector, class loading, exception handling, etc. However, we designed our JVM to be compatible with Oracle's Java class library (rt.jar), so we did not need to re-implement the standard classes in the java.lang package. The class library interacts with the JVM by calling native functions at certain points, e.g., to perform I/O. For our experiments, we implemented only a subset of these functions; for instance, we did not add support for a GUI because none of our example applications require one.

Our current prototype does not support just-in-time compilation or Java reflection. As discussed in Section 3.1, we decided against implementing these because both are major sources of complexity, and neither is likely to be a major source of time noise. Since Oracle's class library invokes reflection at some surprising points (e.g., when instantiating a HashMap), we made some small additions to the class library that can replace the relevant classes without using reflection.

Altogether, our prototype consists of 9,061 lines of C/C++ code; our additions to the class library contribute another 1,150 lines of Java code.

4.2 Isolating the Timed Core

Recall from Section 3.3 that the timed core must be isolated, to the extent possible, from sources of time noise in the rest of the system. One way to accomplish this would be to run the JVM as a standalone kernel; however, we decided against this because of the need for driver support. Instead, we implemented our prototype as a Linux kernel module with two threads. The TC thread runs on one core with interrupts and the NMI disabled; the SC thread runs on a different core and interacts with the TC as discussed in Section 3.4. The SC thread can access the kernel's device drivers, e.g., to send and receive network packets. On NUMA platforms, the two cores should be chosen to be far apart, so they share as little as possible.

To improve the repeatability of cache effects, our prototype uses the same physical memory frames for each execution. We use a separate kernel module for this purpose that is loaded during startup and that reserves a certain range of frames for later use by the TC/SC module.

To reduce the time noise from the CPU itself, we disable timing-relevant features such as frequency scaling and TurboBoost in the BIOS (and, in the case of the latter, again during boot, since Linux surreptitiously re-enables it). Disabling dynamic hardware-level optimizations has a certain performance cost, but it seems unavoidable, since the effect of these optimizations is unpredictable and—at least on current hardware—they cannot be fully controlled by the software. To further reduce the time noise from the CPU, we carefully flush all caches before the execution starts; specifically, we toggle CR4.PCIDE to flush all TLB entries (including global ones) and we use the wbinvd instruction to flush the caches.

4.3 Qualifications

Since our Sanity prototype is built on commodity hardware and a commodity kernel, it cannot guarantee time-determinism, since we cannot rule out the possibility that there is a source of time noise that we have missed. It should be possible to achieve such a guarantee by enforcing time-determinism at each layer—e.g., by starting with a precision-timed system such as PRET [21] and by adding a kernel that is built using the principles from Section 3.

Our Sanity design assumes that play and replay will be performed on machines of the same type. It may be possible to correct for small differences, e.g., by using frequency scaling during replay to match a lower clock speed during play, or by disabling extra cores or memory banks that were not available during play. However we are not aware of any efficient technique that could precisely reproduce the timing of an execution on a completely different architecture.

In the examples described above, each execution of the software under test uses exactly two cores, one TC and one SC. First, the SC is mostly idle because its only purpose is to isolate the TC; thus, the second core is mostly overhead. Second, multithreaded Java programs must be executed entirely on the TC and cannot take advantage of additional cores. These are limitations of the Sanity prototype, and not of TDR: the TC/SC division, and thus the need for a second core, could be avoided in a TDR system that runs directly on the hardware, and the restriction to a single TC could be removed by adapting techniques from existing multi-core replay systems, such as SMP-ReVirt [20], perhaps in combination with novel hardware features, as in QuickRec [41]. Thus, TDR as described herein could execute on a single processor core or on more than two processor cores.

5 Application: Covert Timing Channels

Next, we present a concrete example application for TDR: the detection of covert timing channels that exfiltrate information from a compromised machine.

A covert channel is an unauthorized channel that allows the surreptitious communication of information. Covert channels have become a pervasive security threat in distributed systems, and have produced an arms race between methods for achieving covertness and techniques for detecting such channels (see Section 8). Here, we focus on a class of covert channels called covert timing channels in which a compromised host manipulates the timing of network activities to directly embed covert information into inter-packet delays (IPDs). By observing the timing of packets, the receiver can reconstruct the covert message.

FIG. 5 illustrates a simple covert timing channel. The sender manipulates the delays between sending two consecutive packets to encode a covert message, where bit 1 (resp. 0) is encoded by adding a large (resp. small) IPD, indicated as 'L' (resp. 'S') in the Figure. Upon receiving the network flow, the receiver can then recover the covert message by observing the IPDs between consecutive packets.

5.1 Examples of Timing Channels

Since Lampson first proposed covert timing channels in the 1970s [31], a number of practical channels have been demonstrated in the literature (cf. [4, 11, 12, 14, 15, 45-47]), broadly falling into the following categories:

IP covert timing channel (IPCTC). Like most early timing channels, IPCTC is based on a simple idea: the sender transmits bit 1 by sending a packet within a predetermined time interval, and transmits 0 by remaining silent in that interval. Due to their unique traffic signatures, IPCTCs are straightforward to detect.

Traffic replay covert timing channel (TRCTC). TRCTC tries to confuse detectors by replaying the IPDs from legitimate traffic (without covert channels). It categorizes IPDs in the legitimate traffic stream into two bins ($B_0$ and $B_1$ for small and large IPDs, respectively). It then transmits a 0 by choosing a delay from $B_0$ and a 1 by choosing a delay from $B_1$. However, since the encoding scheme is constant, TRCTC exhibits more regular patterns than a legitimate traffic stream, the latter of which usually has high variability (e.g., burstiness).

Model-based covert timing channel (MBCTC). MBCTC generates IPDs to mimic the statistical properties of legitimate traffic. It periodically fits samples of a legitimate traffic to several models and picks the best fit. Gianvecchio et al. [24] have shown that the shape of the MBCTC traffic is almost the same as the one of legitimate traffic. However, as there is no correlation between consecutive IPDs, MBCTC is highly regular.

There are multiple types of defenses against covert timing channels; for instance, it is possible to disrupt them or to reduce their bandwidth [5, 28, 30, 32], and certain types can even be eliminated with language-based techniques [1] (albeit at the expense of limiting expressiveness). However, recent work has begun to focus more on detection, typically based on traffic statistics. It is this work that is most relevant here.

5.2 State of the Art in Detection

Next, we briefly describe four state-of-the-art detection techniques for covert timing channels.

Shape test [15]. The shape test checks only flow-level statistics; it assumes that the covert channel traffic could be differentiated from legitimate traffic using only first-order statistics, such as the mean and variance of IPDs. While the shape test detects IPCTCs, it is often insufficient to detect more advanced timing channels.

Kolmogorov-Smirnov test (KS-test) [40]. The KS-test assumes that the legitimate traffic and the covert channel traffic are drawn from two different distributions. The KS-test calculates the distance between the empirical distributions of the test sample and training sample (from legitimate traffic). If the distance is above a predetermined threshold, the test distribution is considered to contain a covert timing channel.

Regularity test (RT-test) [15]. The RT-test is based on the observation that the variance of IPDs in legitimate traffic varies over time, while a covert channel manifests a relatively constant variance due to its constant encoding scheme. RT-test groups the traffic into sets of w packets, and compares the standard deviation of pairwise differences between each set. RT-test has the disadvantage that it exhibits a high false positive rate when the legitimate traffic is highly variant.

Corrected conditional entropy (CCE) [22]. The CCE metric extends the notion of the regularity test. It uses a high-order entropy rate to recognize the repeated pattern that is formed by the covert timing channel.

5.3 Detecting Timing Channels with TDR

Existing statistic-based detection techniques rely on the availability of a sufficient amount of legitimate traffic to construct accurate models and tune cut-off thresholds. This greatly reduces the effectiveness of these techniques when such information is not available. In addition, statistic-based techniques are effective when covert timing channels transmit information at a high rate; it is much more difficult to detect slow-rate covert timing channels in which traffic patterns are almost indistinguishable from legitimate ones.

To address these limitations, we propose a novel detection technique for covert timing channels that is based on TDR. Our approach differs fundamentally from the existing ones in Section 5.2 in that we do not look for the presence or absence of specific patterns in the observed traffic; rather, we use TDR to reconstruct what the timing of the packets ought to have been. Concretely, each machine would be required to record its inputs in a log; this log could then be audited periodically, perhaps authenticated with an accountability technique like PeerReview [25], and then replayed with TDR on a different machine, using a known-good implementation of the audited machine's software. In the absence of timing channels, the packet timing during replay should match any observations during play (e.g., from traffic traces); any significant deviation would be a strong sign that a channel is present.

Note that this approach does not require knowledge of a specific encoding, and that it can in principle detect even a delay of a single packet. The adversary's only way to avoid detection would be to make very small changes to the timing, so that they stay below TDR's replay accuracy; however, if the accuracy is high enough, the adversary may no longer be able to distinguish the timing changes from network jitter, which effectively renders the channel unusable.

6 Evaluation

Next, we report results from our experimental evaluation of Sanity. We focus on three key questions: 1) How accurately does Sanity reproduce the timing of the original execution?, 2) What are the costs of running Sanity?, and 3) Is Sanity effective in detecting a variety of covert timing channels?

6.1 Experimental Setup

For our experiments, we deployed Sanity on a Dell Optiplex 9020 workstation, which has a 3.40 Ghz Intel Core i7-4770 CPU, 16 GB of RAM, a 128 GB Vector ZDO SSD, and a 1 Gbps network card. We installed Ubuntu13.12 as the host OS, and we configured it with a RAM disk for storing the logs and the files for the NFS server.

We also installed the 32-bit version of Oracle's Java SE 7u51 JVM, so we can compare the performance of Sanity to that of a state-of-the-art JVM. However, Oracle's JVM supports just-in-time (JIT) compilation, whereas Sanity does not; hence, to enable meaningful comparisons, we report two sets of results for the Oracle JVM: one with the default settings, and another in which the −Xint flag is set. The latter forces the JVM to interpret the Java bytecode rather than compiling it, just like Sanity. We refer to these configurations as Oracle-JIT and Oracle-INT, respectively.

TABLE 2

SciMark2 performance of Sanity and Oracle's JVM, normalized to Oracle's JVM in interpreted mode.

| Benchmark | Sanity | Oracle-INT | Oracle-JIT |
|---|---|---|---|
| SOR | 7.4211 | 1 | 0.2634 |
| SMM | 1.0674 | 1 | 1.1200 |
| MC | 4.0890 | 1 | 0.0305 |
| FFT | 8.4068 | 1 | 0.1590 |
| LU | 0.2555 | 1 | 0.0353 |

6.2 Speed

The first question we examine is whether the presence of TDR imposes a major performance penalty. Ideally, we would simply "enable" and "disable" TDR in the same codebase, but this is hard to do because TDR is a design feature. However, we can at least obtain some qualitative results by comparing the results from a computation-intensive benchmark.

As a workload, we chose NIST's SciMark 2.0 [42] Java benchmark that consists of five computational kernels: a fast Fourier transform (FFT), a Jacobi successive over-relaxation (SOR), a Monte Carlo integration (MC), a sparse matrix multiply (SMM) and a lower-upper factorization (LU). We ran each benchmark in each of our three configurations (Sanity, Oracle-JIT, and Oracle-INT), and we measured the completion time.

Table 2 shows our results. Since Sanity lacks a JIT compiler, it cannot match the performance of Oracle's JVM with JIT compilation enabled. However, the comparison with the Oracle JVM in interpreted mode is more mixed; sometimes one JVM is faster, and sometimes the other. We note that Sanity has some advantages over the Oracle JVM, such as the second core and the privilege of running in kernel mode with pinned memory and IRQs disabled, so this is not a completely fair comparison. Nevertheless, at the very least, these results suggest that TDR is not impractical.

6.3 Timing Stability

A key requirement for any TDR implementation is timing stability: two executions of the same program with the same inputs and the same initial state must take a very similar amount of time. To quantify the stability of Sanity's timing, we again use the SciMark benchmark because it takes no external inputs, so it is easy to reproduce the same execution even without deterministic replay. We ran each benchmark on Sanity 50 times, and we calculated the difference between the longest and the shortest execution. For comparison, we performed the same experiment on two variants of the Oracle-INT configuration: a "dirty" variant, in which the machine is in multi-user mode, with a GUI and with networking enabled, and a "clean" variant in which the machine is in single-user mode and the JVM is the only program running. The latter approximates the closest one can get to timing stability with an out-of-the-box Oracle JVM.

Figure 6:
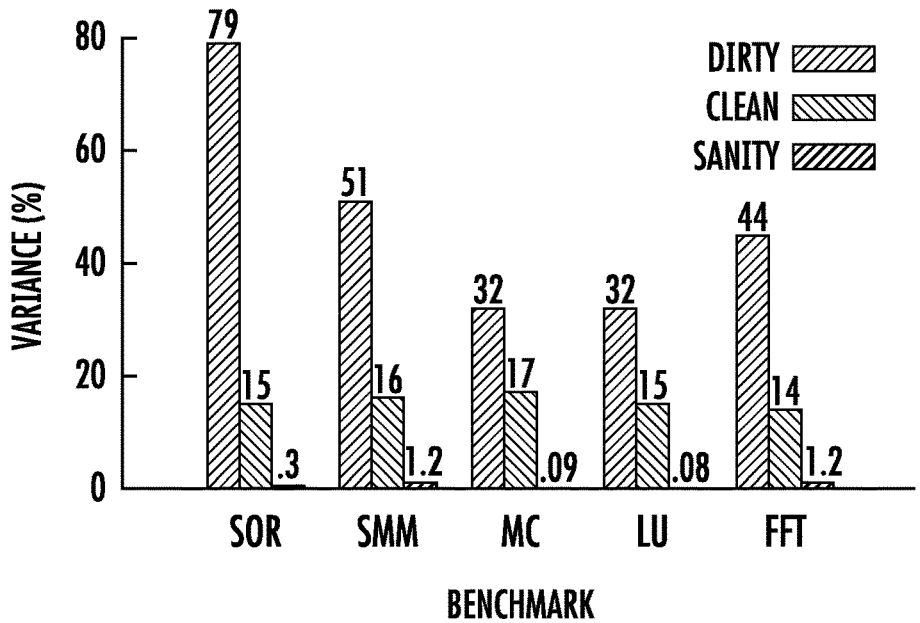
FIG. 6 is a graph illustrating timing variance for SciMark2, using either Sanity or the Oracle JVM in the dirty and clean configurations as described below.

FIG. 6 shows our results. Not surprisingly, timing in the "dirty" configuration can vary considerably, in some cases by 79%; this is because of the many sources of time noise (such as preemptions and concurrent background tasks) that are present in this configuration. In the "clean" configuration, the variability is more than an order of magnitude lower; Sanity can reduce it by another order of magnitude or more, to the point where all execution times are within 0.08%-1.22% of each other (the corresponding bars in FIG. 6 are there, but are hard to see). This suggests that Sanity effectively mitigates or eliminates the major sources of time noise.

6.4 Replay Accuracy

Next, we examine how well Sanity can fulfill its promise of repeatable timing. For this purpose, we use an I/O intensive benchmark because I/O is a major source of time noise; also, this allows us to easily collect many traces with different inputs and thus different timing behavior. We chose nfsj [37], an open-source NFS server that is written in Java. We made some small modifications to nfsj to adapt it to our Java runtime, mostly to constructs that require reflection, which Sanity does not yet support.

We gathered 100 one-minute traces of the NFS server while it was handling requests, and we then replayed each of the traces. As a first sanity check, we compared the original execution time of each trace to the execution times of its replay. We found that 97% of the replays were within 1% of the original execution time; the largest difference we observed was 1.85%. Recall that deterministic replay requires very different operations in the VMM during play and replay, so this result is far more remarkable than the stability we have shown in Section 6.3: it is a result of the careful alignment of play and replay in Sanity's design.

To examine these results in more detail, we also recorded the timing of each individual message the NFS server transmitted during each play and replay. We then took each pair of consecutive messages $(m_j^i, m_{j+1}^i)$ in each replayed trace $T_i$ and calculated the difference between a) the transmission times of these messages during replay, and b) the transmission times of the corresponding messages during play, shown respectively on the y- and x-axes of FIG. 7. If Sanity had reproduced the timing exactly, the two differences would be identical, and the graph would show a straight line; in practice, there is some remaining variability due to remaining sources of time noise. However, all the differences are within 1.85%.

6.5 Log Size

An important source of overhead in Sanity is the log of nondeterministic events that the SC must write to stable storage during the execution. To quantify this, we examined our NFS traces from Section 6.4 and found that the logs grew at a rate of approximately 20 kB/minute. Not surprisingly, the logs mostly contained incoming network packets (84% in our trace); recall that these must be recorded in their entirety, so that they can be injected again during replay. (In contrast, packets that the NFS server transmits need not be recorded because the replayed execution will produce an exact copy.) A small fraction of the log consisted of other entries, e.g., entries that record the wall-clock time during play when the VM invokes System.nanoTime.

We note that Sanity requires no additional log entries specifically for TDR, so its logs should generally be no larger (or smaller) than those of previous implementations of deterministic replay. For instance, Dunlap et al. [19], which describes a replay system for IA-32, reported a log growth rate of 1.4 GB/day for SPECweb99, and 0.2 GB/day for a desktop machine in day-to-day use. We expect that Sanity's logs would have a similar size, so, given today's inexpensive storage, keeping the logs for a few days should be perfectly feasible.

6.6 Covert-Channel Experiments

In the rest of this section, we report results from our covert-channel experiments. For these experiments, we implemented the IPCTC, TRCTC, and MBCTC covert channels from Section 5.1 in our nfsj-based NFS file server. The channels add delays using a special JVM primitive that we can enable or disable at runtime; this allows us to easily collect traces with and without timing channels, without making changes to the server code.

In a real attack—e.g., in the cloud computing scenario—the server's messages would need to traverse a wide-area network and thus incur additional time noise that must be considered by the sender of a covert timing channel. To represent this in our experiments, we locate the NFS client and server at two different universities on the U.S. East coast. The RTT between the two was approximately 10 ms, and (based on 1000 ICMP ping measurements) the 50th, 90th, and 99th percentile jitter was 0.18 ms, 0.80 ms, and 3.91 ms, respectively. Since the content of the files on the NFS server is irrelevant, we simply used a workload of 30 files with sizes between 1 kB and 30 kB; the client reads all of these files one after the other.

To compare Sanity against the timing detectors described in Section 5.1—shape test, KS-test, regularity test (RT-Test), and corrected conditional entropy (CCETest)—we ran experiments with each detector-channel combination. During each experiment, we gathered a packet trace on the server itself; this eliminates detection errors due to network jitter, and it approximates a scenario where the detector is very close to the server (for instance, it might be run by the network administrator). The traces were available to detectors; our Sanity-based detector additionally had access to the server's log and (for replay) to a non-compromised nfsj binary.

6.7 Detection Performance: Haystacks

To make comparisons amongst the detectors, we vary the discrimination threshold of each detection technique. For the Sanity-based detector, this is the minimum difference between an observed IPD and the corresponding IPD during replay that will cause the detector to report the presence of a channel; the other detectors have similar thresholds. For each setting, we obtain a true-positive and a false-positive rate, and we plot these in a graph to obtain each detector's receiver operating characteristic (ROC) curve. An ideal detector would exhibit perfect recall (a true positive rate of 1.0) and specificity (a false positive rate of 0), and is depicted in a ROC curve as an upside-down L. We also measure the area under the curve (AUC) of each ROC curve, which correspondingly ranges from 0 (poor classification) to 1 (an ideal classifier).

Figure 8A:
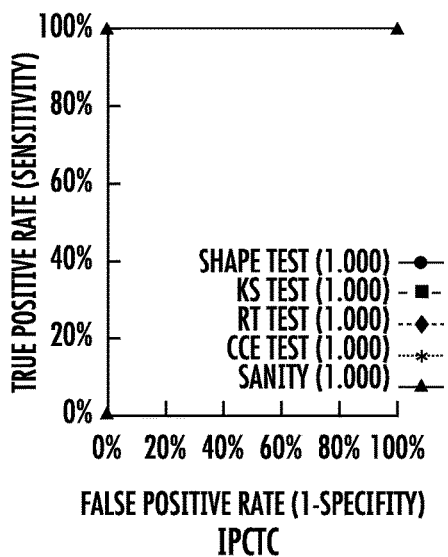
FIGS. 8A-8D illustrate receiver operating characteristic (ROC) curves for four covert channels and five detectors as will be described below. The area under the curve (AUC) is shown in parenthesis in the legend in each graph.
Figure 8B:
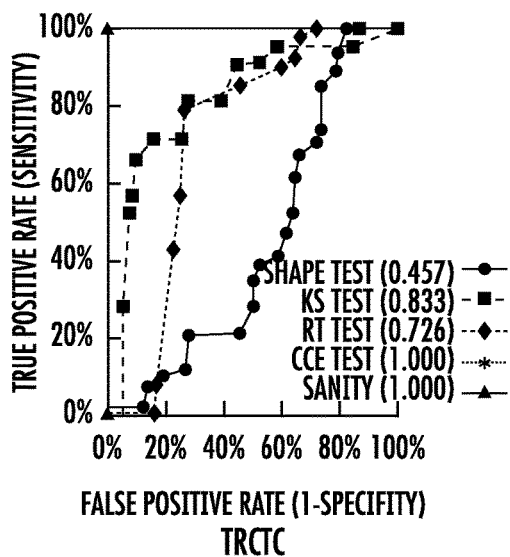
Figure 8C:
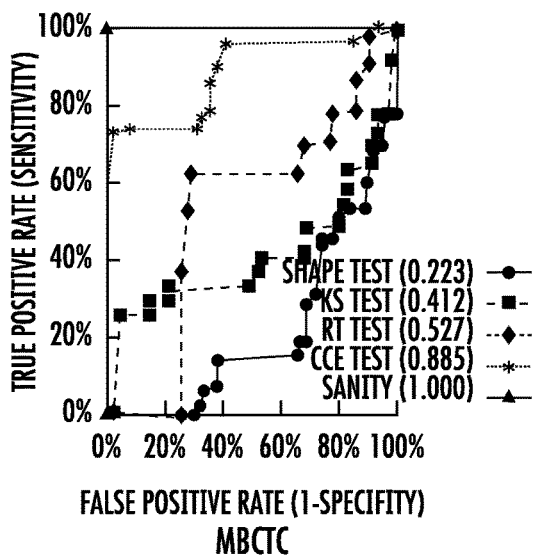

FIGS. 8A-8C show the resulting ROC curves for the IPCTC, TRCTC, and MBCTC channels. As expected, the simplistic IPCTC technique is detected by all tests, confirming earlier results [15]. The other channels more successfully evade detection when pitted against a mismatched detection technique; for instance, TRCTC does well against shape tests but is detectable by more advanced detection techniques; it preserves first-order traffic statistic but produces a distribution of IPDs that significantly differs from that of normal traffic. As expected, our Sanity-based detector offered perfect detection (AUC=1), which confirms that it can match or exceed the performance of existing detectors.

6.8 Detection Performance: Needles

Next, we consider our fourth covert timing channel, which differs from all the other channels in that it is short-lived. This represents a more realistic scenario in which the sender (the NFS server) wishes to exfiltrate a small secret—for example, a password or private key. To minimize the risk of detection, the sender toggles its use of the covert channel, transmitting a single bit once every 100 packets. Thus, the channel does not change high-level traffic statistics very much, which makes it very difficult to detect with existing methods.

Figure 8D:
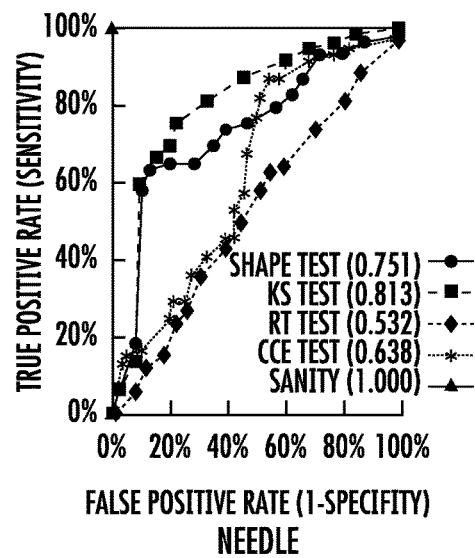

FIG. 8D shows the ROC curves for this channel. As expected, all the existing detectors failed to reliably detect the channel; in contrast, our Sanity-based detector still provided perfect accuracy. This is expected because, unlike existing detectors, Sanity does not rely on statistical tests that must be carefully tuned to balance the risks of under- and over-detection; instead, TDR-based detectors can potentially find any significant timing variation, even if it affects only a single packet.

6.9 Time Noise vs. Jitter

As discussed in Section 3 and empirically measured in Sections 6.3 and 6.4, TDR does not completely eliminate all sources of time noise. For example, contention between the SC and the TC on the memory bus might affect different executions in slightly different ways. In theory, an adversary could exploit this remaining time noise to construct a covert channel that avoids detection: if the differences between log and replay due to the covert channel are within the range of normal time noise, then Sanity will fail to detect the channel.

Figure 7:
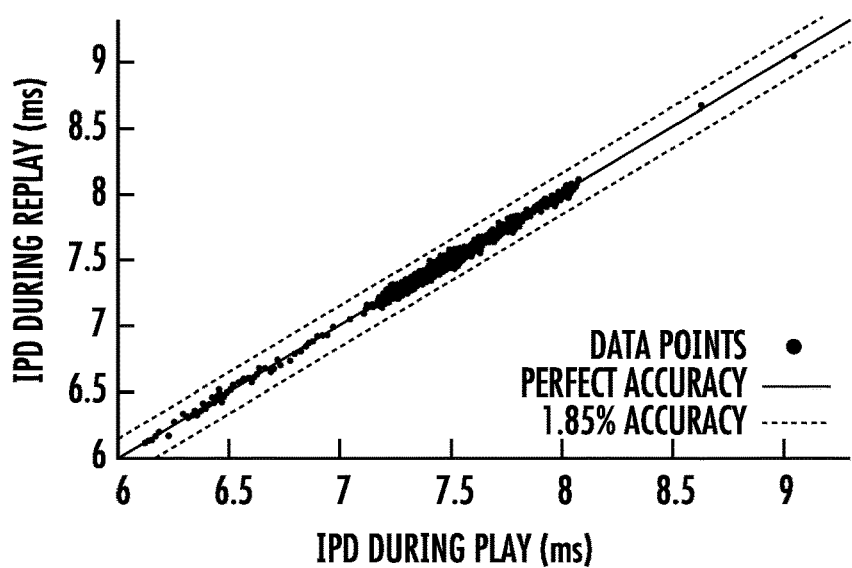
FIG. 7 is a graph illustrating a comparison of inter-packet delays during play and replay for NFS traces used in an experiment described below.

However, such a strategy is infeasible in practice due to the vast asymmetry between time noise allowed by Sanity and time noise due to the network (i.e., network jitter). FIG. 7 demonstrated that the timing noise allowed by Sanity is under 1.85% of the original IPDs, that is, 0.14 ms for a median IPD of 7.4 ms. On the other hand, the measured median jitter is 0.18 ms, which is 129% of the allowed noise. Note that the jitter is measured between two well-provisioned universities; it is a very conservative estimation of the jitter that the traffic of a covert timing channel would encounter. For example, the median jitter of broadband connection has been measured to be approximately 2.5 ms [18]. To avoid detection, the adversary would need to accept an extremely low accuracy of reception, making such an avoidance strategy impractical.

6.10 Summary

Our results confirm that it is possible to reproduce execution times with high accuracy, even on commodity hrdware. Our prototype currently cannot match the performance of a state-of-the-art JVM, but, as discussed in Section 3.1 it should be possible to get better performance by adding features such as JIT. As an example of an interesting new application that TDR enables, we have demonstrated a novel, TDR-based detector for covert timing channels that outperforms existing detectors both in terms of accuracy and in terms of generality. To avoid triggering this detector, an adversary would need to use extremely small timing variations that would most likely be lost in the jitter of a wide-area network.

7 Discussion

Multi-tenancy: Although Sanity currently supports only a single VM per machine, it should be possible to provide TDR on machines that are running multiple VMs. The key challenge would be isolation: the extra VMs would introduce additional time noise into each other's execution, e.g., via the shared memory bus. We speculate that recent work in the real-time domain [51] could mitigate the "cross-talk" between different VMs; techniques such as [33] could be used to partition the memory and the cache. If the partitions are equivalent, it may even be possible to replay an execution in a different partition from the one in which it was recorded, which would remove the need to have the same physical pages available during play and replay.

Accountability: Although TDR can detect inconsistencies between the timing of messages and the machine configuration that supposedly produced them, it cannot directly prove such inconsistencies to a third party. This capability could be added by combining TDR with accountability techniques, such as accountable virtual machines [26]. However, the latter are designed for asynchronous systems, so a key challenge would be to extend them with some form of "evidence of time".

8 Related Work

Covert timing channels. We have already discussed prior work on timing channel detection in Sections 5.1 and 5.2. Briefly, TDR is different in two ways: 1) it looks at the timing of individual packets rather than high-level traffic statistics, which gives it the ability to detect even low-rate, sporadic channels, and 2) it does not look for specific anomalies but rather for deviations from the expected timing, which enables the detection of novel channels. We know of only one other work, Liu et al. [34] that uses a VM-based detector, but [34] simply replicates incoming traffic to two VMs on the same machine and compares the timing of the outputs. Moreover, without determinism the two VMs would soon diverge and cause a large number of false positives.

Deterministic replay. There is a large body of work on enabling deterministic replay at various levels, e.g., at the hardware level [27] or the OS level [3, 6, 8-10, 17, 36, 38, 39]. However, these solutions reproduce only the functional behavior of the program. To our knowledge, TDR is the first primitive that can accurately reproduce the temporal behavior as well.

Real-time systems. Timing stability has also been a design goal of precision-timed (PRET) machines [21]. The PRET machines reduce variances in the execution time using deadline instructions [29], thread-interleaved pipeline [35], and scratchpad-based memory hierarchy [35, 43]. These machines can potentially achieve a very stable timing, although they do require new processor designs. There also exist time-predictable architectures for real-time systems that can indirectly enable stable timing, such as MCGREP [48] and JOP [44], by making the execution time more deterministic. However, we are not aware of any existing work that provides both repeatable timing and deterministic replay.

9 Conclusion

The subject matter described herein includes time-deterministic replay (TDR), a mechanism for reproducing both the execution and the timing of a program. TDR is well-suited for a number of system administrator and developer tasks, including debugging, forensics, and attack detection.

TDR presents a number of design and engineering challenges—modern commodity processors and operating systems are tailored for performance, not for precise and identical repetition of processes. We eliminate or mitigate many sources of "time noise" and demonstrate the feasibility of TDR by implementing a proof-of-concept TDR-capable JVM that we call Sanity. Our benchmarking experiments reveal that Sanity can reproduce the timing of an execution to within 1.85% of the original. We additionally demonstrate the practicality of TDR by using Sanity to detect a variety of classes of covert timing channels. Our results are encouraging: Sanity is able to detect even extremely subtle and low-bandwidth timing channels that fail to be detected using standard shape- and statistical-based detection approaches.

The disclosure of each of the following references is incorporated by reference herein in its entirety.

REFERENCES

[1] J. Agat. Transforming out timing leaks. In Proc. POPL, January 2000.

[2] B. Alpern, T. Ngo, J.-D. Choi, and M. Sridharan. DejaVu: Deterministic Java Replay Debugger for Jalapeno Java Virtual Machine. In OOPSLA Addendum, October 2000.

[3] G. Altekar and I. Stoica, ODR: Output-deterministic replay for multicore debugging. In Proc. SOSP, October 2009.

[4] S. Arimoto. An algorithm for computing the capacity of arbitrary discrete memoryless channels. IEEE Trans. Inf. Theor., 18(1):14-20, September 2006.

[5] A. Askarov, D. Zhang, and A. C. Myers. Predictive black-box mitigation of timing channels. In Proc. CCS, October 2010.

[6] A. Aviram, S.-C. Weng, S. Hu, and B. Ford. Efficient system enforced deterministic parallelism. In Proc. OSDI, October 2010.

[7] P. Axer, R. Ernst, H. Falk, A. Girault, D. Grund, N. Guan, B. Jonsson, P. Marwedel, J. Reineke, C. Rochange, M. Sebastian, R. von Hanxleden, R. Wilhelm, and W. Yi. Building timing predictable embedded systems. ACM TECS, 13(4):82:1-37, 2014.

[8] T. Bergan, O. Anderson, J. Devietti, L. Ceze, and D. Grossman. Coredet: A compiler and runtime system for deterministic multithreaded execution. In Proc. ASPLOS, March 2010.

[9] T. Bergan, N. Hunt, L. Ceze, and S. D. Gribble. Deterministic process groups in dOS. In Proc. OSDI, October 2010.

[10] E. D. Berger, T. Yang, T. Liu, and G. Novark. Grace: Safe multithreaded programming for C/C++. In Proc. OOPSLA, October 2009.

[11] V. Berk, A. Giani, and G. Cybenko. Detection of covert channel encoding in network packet delays. Technical Report TR2005-536, Dartmouth College.

[12] R. Blahut. Computation of channel capacity and rate-distortion functions. IEEE Trans. Inf. Theor., 18(4):460-473, 1972.

[13] A. Burtsev. Xen deterministic time-travel (XenTT). http://www.cs.utah.edu/ aburtsev/xen-tt-doc/.

[14] S. Cabuk. Network Covert Channels: Design, Analysis, Detection, and Elimination. PhD thesis, Purdue Univ., December 2006.

[15] S. Cabuk, C. E. Brodley, and C. Shields. IP covert timing channels: Design and detection. In Proc. CCS, October 2004.

[16] J.-D. Choi and H. Srinivasan. Deterministic Replay of Java Multithreaded Applications. In Proc. SPDT, August 1998.

[17] J. Devietti, B. Lucia, L. Ceze, and M. Oskin. DMP: Deterministic shared memory multiprocessing. In Proc. ASPLOS, March 2009.

[18] M. Dischinger, A. Haeberlen, K. P. Gummadi, and S. Saroiu. Characterizing Residential Broadband Networks. In Proc. IMC, October 2007.

[19] G. W. Dunlap, S. T. King, S. Cinar, M. Basrai, and P. M. Chen. ReVirt: Enabling intrusion analysis through virtual-machine logging and replay. In Proc. OSDI, December 2002.

[20] G. W. Dunlap, D. Lucchetti, P. M. Chen, and M. Fetterman. Execution replay for multiprocessor virtual machines. In Proc. VEE, March 2008.

[21] S. A. Edwards and E. A. Lee. The case for the precision timed (PRET) machine. In Proc. DAC, June 2007.

[22] S. Gianvecchio and H. Wang. Detecting covert timing channels: An entropy-based approach. In Proc. CCS, October 2007.

[23] S. Gianvecchio and H. Wang. An Entropy-Based Approach to Detecting Covert Timing Channels. IEEE Transactions on Dependable and Secure Computing, 8(6): 785-797, November 2011.

[24] S. Gianvecchio, H. Wang, D. Wijesekera, and S. Jajodia. Modelbased covert timing channels: Automated modeling and evasion. In Proc. RAID, September 2008.

[25] A. Haeberlen, P. Kuznetsov, and P. Druschel. PeerReview: Practical accountability for distributed systems. In Proc. SOSP, October 2007.

[26] A. Haeberlen, P. Aditya, R. Rodrigues, and P. Druschel. Accountable virtual machines. In Proc. OSDI, October 2010.

[27] D. R. Hower, P. Dudnik, M. D. Hill, and D. A. Wood. Calvin: Deterministic or not? free will to choose. In Proc. HPCA, 2011.

[28] W.-M. Hu. Reducing timing channels with fuzzy time. In IEEE Symposium on Security and Privacy, May 1991.

[29] N. J. H. Ip and S. A. Edwards. A processor extension for cycleaccurate real-time software. In Proc. EUC, August 2006.

[30] M. H. Kang, I. S. Moskowitz, and D. C. Lee. A network pump. IEEE Trans. Softw. Eng., 22:329-338, May 1996.

[31] B. W. Lampson. A note on the confinement problem. Communications of the ACM, 16:613-615, October 1973.

[32] P. Li, D. Gao, and M. K. Reiter. Mitigating access-driven timing channels in clouds using StopWatch. In Proc. DSN, June 2013.

[33] J. Liedtke, H. Hartig, and M. Hohmuth. OS-controlled cache predictability for real-time systems. In Proc. RTAS, June 1997.

[34] A. Liu, J. Chen, and H. Wechsler. Real-time covert timing channel detection in networked virtual environments. In Proc. International Conference on Digital Forensics. January 2013.

[35] I. Liu, J. Reineke, D. Broman, M. Zimmer, and E. Lee. A PRET microarchitecture implementation with repeatable timing and competitive performance. In Proc. ICCD, September 2012.

[36] T. Liu, C. Curtsinger, and E. D. Berger. Dthreads: Efficient deterministic multithreading. In Proc, SOSP, October 2011.

[37] nfsj. https://code.google.com/p/nfsj/.

[38] M. Olszewski, J. Ansel, and S. Amarasinghe. Kendo: Efficient deterministic multithreading in software. In Proc. ASPLOS, March 2009.

[39] S. Park, Y. Zhou, W. Xiong, Z. Yin, R. Kaushik, K. H. Lee, and S. Lu. PRES: Probabilistic replay with execution sketching on multiprocessors. In Proc. SOSP, October 2009.

[40] P. Peng, P. Ning, and D. Reeves. On the secrecy of timing-based active watermarking trace-back techniques. In Proc. IEEE Security and Privacy, May 2006.

[41] G. Pokam, K. Danne, C. Pereira, R. Kassa, T. Kranich, S. Hu, J. Gottschlich, N. Honarmand, N. Dautenhahn, S. T. King, and J. Torrellas. QuickRec: Prototyping an Intel architecture extension for record and replay of multi-threaded programs. In Proc. ISCA, June 2013.

[42] R. Pozo and B. Miller. SciMark 2.0. http://math.nist-.gov/scimark2/.

[43] J. Reineke, I. Liu, H. Patel, S. Kim, and E. A. Lee. Pret dram controller: Bank privatization for predictability and temporal isolation. In Proc. CODES+ISSS, October 2011.

[44] M. Schoeberl. A java processor architecture for embedded realtime systems. J. Syst. Archit., 54(1-2):265-286, January 2008.

[45] G. Shah, A. Molina, and M. Blaze. Keyboards and covert channels. In Proc. USENIX Security, July 2006.

[46] X. Wang and D. S. Reeves. Robust correlation of encrypted attack traffic through stepping stones by manipulation of interpacket delays. In Proc. CCS, October 2003.

[47] X. Wang, S. Chen, and S. Jajodia. Tracking anonymous peer-topeer VoIP calls on the internet. In Proc. CCS, November 2005.

[48] J. Whitham and N. Audsley. MCGREP—A predictable architecture for embedded real-time systems. In Proc. RTSS, December 2006.

[49] R. Wilhelm. Determining bounds on execution times. In R. Zurawski, editor, Handbook on Embedded Syst. CRC Press, 2005.

[50] R. Wilhelm, J. Engblom, A. Ermedahl, N. Holsti, S. Thesing, D. Whalley, G. Bernat, C. Ferdinand, R. Heckmann, T. Mitra, F. Mueller, I. Puaut, P. Puschner, J. Staschulat, and P. Stenstrom. The worst-case execution-time problem-overview of methods and survey of tools. ACM TECS, 7(3):36:1-36:53, May 2008.

[51] Z. P. Wu, Y. Krish, and R. Pellizzoni. Worst case analysis of DRAM latency in multi-requestor systems. In Proc. RTSS, December 2013.

[52] M. Xu, V. Malyugin, J. Sheldon, G. Venkitachalam, and B. Weissman. ReTrace: Collecting execution trace with virtual machine deterministic replay. In Proc. MoBS, June 2007.

[53] Z. Yang, M. Yang, L. Xu, H. Chen, and B. Zang. ORDER: Object centRic DEterministic Replay for Java. In Proc. USENIXATC, June 2011.

As stated above, the Sanity software may be used during a play execution of software that is being tested for a covert timing channel to record inputs and the timings of the inputs and also to record outputs for later comparison to determine whether the software includes a covert timing channel. The outputs may be recorded in memory of the computer on which the Sanity software executes or in a separate location, such as a border router, to avoid having to store the output on the machine that is potentially compromised. The one thing that the auditor does have to know reliably is the sequence of outputs and their timestamps, and if this were recorded on the machine itself and the machine is compromised, the adversary could change the recorded messages and/or timestamps. Thus, storing the outputs and their timestamps separately from the potentially compromised machine reduced the likelihood of modification by the adversary. The outputs and their timestamps can be recorded using a standard recording tool, such as tcpdump.

Figure 9A:
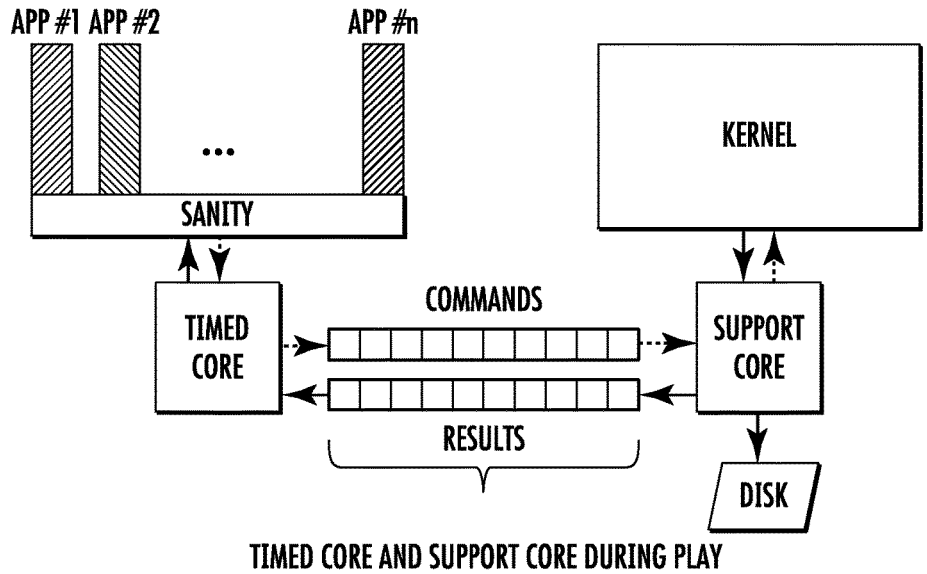
FIG. 9A is a block diagram illustrating exemplary operations performed during a play execution of software being tested for covert timing channels according to an embodiment of the subject matter described herein.

FIG. 9A illustrates exemplary operations of the Sanity software during a play execution according to an embodiment of the subject matter described herein. The play execution is where software, illustrated in FIG. 9A as one or more of the applications, is executed within the Sanity virtual machine on the timed core. The Sanity virtual machine can be thought of as a time deterministic software execution module that in the play execution ensures time deterministic execution of the application and records the inputs and outputs and their associated timings. In the illustrated example, the Sanity software accepts native calls from applications running on the Sanity virtual machine and sends the calls to the T-S buffer, illustrated as commands in FIG. 9A. The support core performs that native calls by calling the kernel and puts the results back in the S-T buffer for access by the Sanity software. If the system calls can take different amounts of time, the support core may need to 'pad' the time to a deterministic maximum, simply by waiting if the call should finish earlier than that. This isn't necessary for transmitted network messages (since there is no 'result' in that case) but it is necessary, e.g., for disk I/O. The result of each of the commands will also be logged to disk. Simply recording the duration of a system call won't help because the adversary could simply pretend that the system call took more or less time, and thus modulate the timing of the messages. So we actually don't record the timing (duration) of system calls, only their result, and we rely on the 'padding' to get the same duration during replay.

Figure 9B:
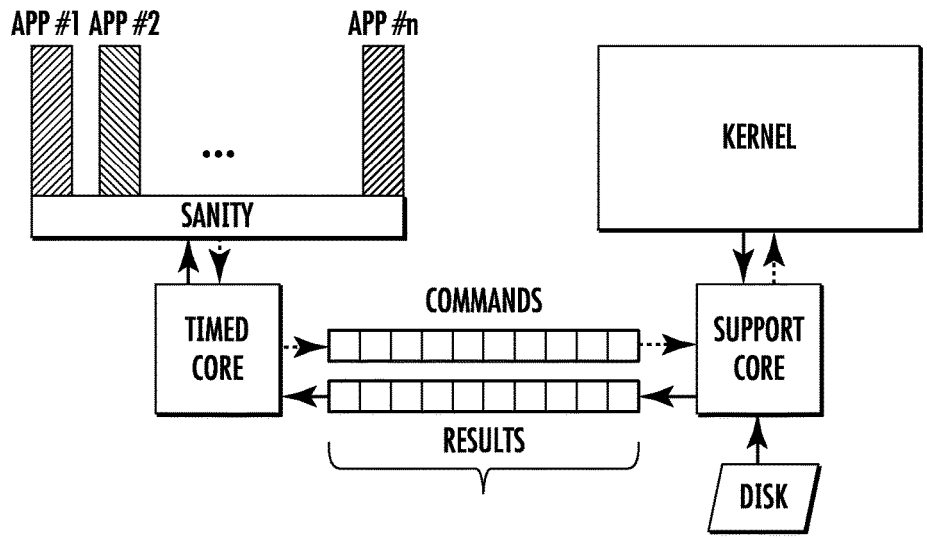
FIG. 9B is a block diagram illustrating exemplary operations performed during a replay execution of software being tested for covert timing channels according to an embodiment of the subject matter described herein.

During replay execution, a known good version of the software being tested is executed within the execution environment provided by the Sanity software using the inputs and timings recorded during the play execution. FIG. 9B illustrates exemplary operations performed during a replay execution according to an embodiment of the subject matter described herein. Referring to FIG. 9B, the Sanity software accepts native calls from applications running and sends the calls to the T-S buffer. The support core performs the native calls by calling the kernel or reading the log from the disk as appropriate (different kinds of commands will require different choices here, e.g., disk I/O will probably result in a kernel call, whereas reading the current time would result in a log read) and puts the results back in the S-T buffer for access by Sanity. The result for each of the commands and the time that they should be replayed is read from the log and exactly replayed by the application under test executed within the Sanity virtual machine.

Figure 10:
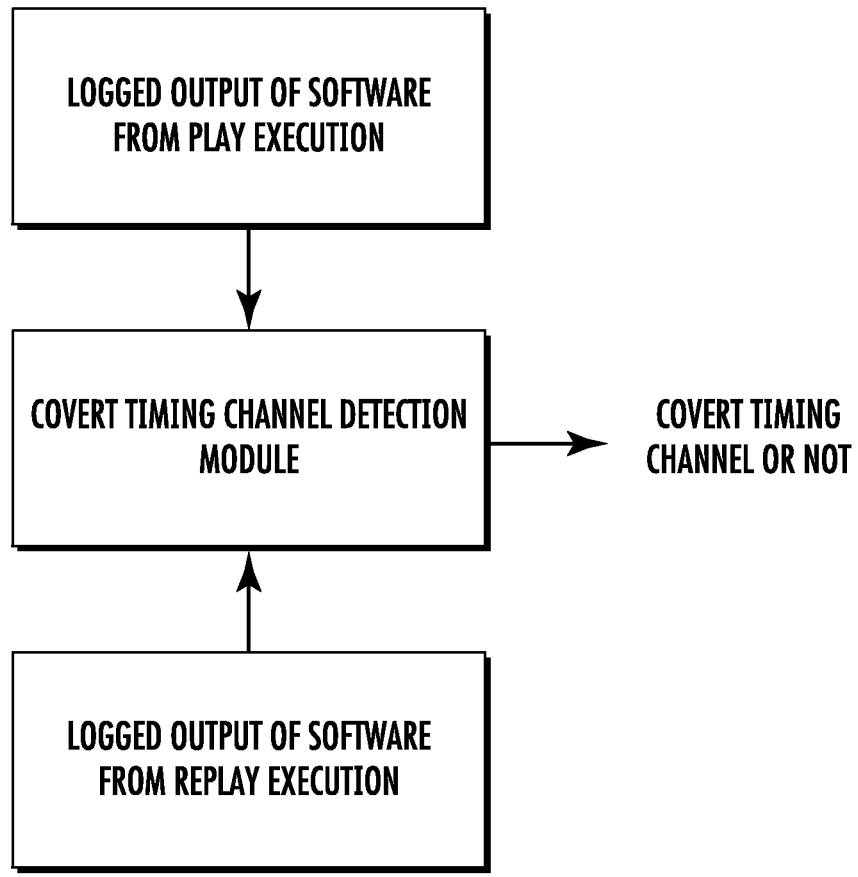
FIG. 10 is a block diagram illustrating the comparison of outputs from the play and replay execution of software being tested for covert timing channels according to an embodiment of the subject matter described herein.

The results (outputs and timings of outputs) from the replay execution, which should indicate normal execution of the software being tested, are compared with the results from the play execution, which may or may not include a covert timing channel. FIG. 10 illustrates the comparisons of these results. The results may be compared by a covert timing channel detection module that looks for differences in timing between the outputs of the play and replay executions. As stated above, the outputs of the potentially compromised machine may be stored separately from that machine, for example, on a border router. The covert timing channel detection module may execute on the border router or on a machine separate from the border router that has access to the stored outputs.

If a difference in timing between the play and replay executions exists, the covert timing channel detection module may output an indication of the difference to the user and indicate the presence of a covert timing channel depending on the degree of difference. In determining whether a difference in timing exists, the covert timing channel detection module may check the sequence of outputs and their timings. If the replay execution produces different outputs, this indicates that the adversary has performed a less sophisticated attack (i.e., he or she changed the software to actually produce different outputs, extra outputs, or to suppress outputs), and we can detect this as an 'easy' special case. Thus, if the outputs and/or the timings of the outputs of the relay execution differ from those of the play execution by more than a predetermined amount (e.g., 2%), a covert timing channel may be indicated.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting covert timing channels using time deterministic replay, the method comprising:
   recording inputs, timings of the inputs, outputs, and timings of outputs of a play execution of software S, wherein the play execution of the software S is implemented on a virtual machine executing on timed processor core (TC), wherein the virtual machine receives calls from applications running on the virtual machine and sends the calls to a timed-supporting (T-S) buffer;
   during the play execution of the software S, using a supporting processor core (SC) to handle interrupts and input/output (I/O) on behalf of the TC by reading the calls from the T-S buffer, performing the calls, and writing results of the calls to a supporting-timed (S-T) buffer, wherein the TC reads the results of the calls from the S-T buffer during the play execution;
   using the inputs and the timings of the inputs from the play execution to perform a replay execution of a reference copy of software S and recording outputs and timings of outputs the replay execution, wherein during the replay execution, the TC reads the inputs from the S-T buffer and writes the outputs to the T-S buffer;
   comparing the timings of the outputs of the play execution to the timings of outputs of the replay execution to determine whether the output of the play execution contains a covert timing channel.

2. The method of claim 1 wherein using the inputs and the timings of the inputs to time deterministically perform the replay execution includes structuring execution environments of the play and replay executions to reduce variability in the timings of the outputs between the play and replay executions.

3. The method of claim 2 wherein structuring the execution environments to reduce variability in the timings of the outputs includes recording non-deterministic events occurring in the execution environment during the play execution and injecting the non-deterministic events into the replay execution at the same execution points that the events occurred during the play execution.

4. The method of claim 3 wherein structuring the execution environments to reduce the variability in the timings of the outputs includes utilizing deterministic multi-threading in the play and replay executions where each runnable thread is given a deterministic condition that triggers the thread to yield control of processing resources to another thread.

5. The method of claim 1 further comprising comparing differences in the outputs of the play and replay executions to detect the presence of the covert timing channel.

6. The method of claim 1 wherein using the inputs to time deterministically perform the replay execution includes executing synchronous execution events on the TC and confining asynchronous execution events to the SC.

7. The method of claim 6 wherein the SC receives asynchronous inputs and writes the asynchronous inputs to the S-T buffer and wherein the TC periodically inspects the S-T buffer or when a read operation is invoked.

8. The method of claim 7 wherein the TC writes outputs to the T-S buffer and the SC periodically inspects and forwards outputs from the S-T buffer.

9. The method of claim 8 wherein a write of a time value to the T-S buffer during the play execution is structured to produce the same memory access pattern as a read of the timing value from the S-T buffer during the replay execution.

10. The method of claim 2 wherein structuring the execution environments includes ensuring that an initial machine state is the same for the play and replay executions.

11. The method of claim 6 wherein structuring the execution environments includes using the SC for I/O operations.

12. A system for detecting covert timing channels using time deterministic replay, the system comprising:
a time deterministic software execution module for recording inputs, timings of the inputs, outputs, and timings of outputs of a play execution of software and for using the inputs and the timings of the inputs from the play execution to perform a replay execution of a reference copy of software S and recording outputs and timings of outputs the replay execution, wherein the play execution of the software S is implemented on a virtual machine executing on timed processor core (TC), wherein the virtual machine receives calls from applications running on the virtual machine and sends the calls to a timed-supporting (T-S) buffer and, during the play execution of the software S, the time deterministic software execution module uses a supporting processor core (SC) to handle interrupts and input/output (I/O) on behalf of the TC by reading the calls from the T-S buffer, performing the calls, and writing results of the calls to a supporting-timed (S-T) buffer, wherein the TC reads the results of the calls from the S-T buffer during the play execution and, during the replay execution, the TC reads the inputs from the S-T buffer and writes the outputs to the T-S buffer; and
a covert timing channel detection module for comparing the timings of the outputs of the play execution to the timings of outputs of the replay execution to determine whether the output of the play execution contains a covert timing channel.

13. The system of claim 12 wherein the time deterministic software execution module is configured to structure execution environments of the play and replay executions to reduce variability in the timings of the outputs between the play and replay executions.

14. The system of claim 13 wherein the time deterministic software execution module is configured to record non-deterministic events occurring in the execution environment during the play execution and inject the non-deterministic events into the replay execution at the same points that the events occurred during the play execution.

15. The system of claim 14 wherein the time deterministic software execution module is configured to utilize deterministic multi-threading in the play and replay executions where each runnable thread is given a deterministic condition that triggers the thread to yield control of processing resources to another thread.

16. The system of claim 12 wherein the covert timing channel detection module is configured to compare differences in the outputs of the play and replay executions to detect the presence of the covert timing channel.

17. The system of claim 12 wherein the time deterministic software execution module is configured to execute synchronous execution events on the TC and confine asynchronous execution events to the SC.

18. The system of claim 17 wherein the SC receives asynchronous inputs and writes the asynchronous inputs to the S-T buffer and wherein the TC periodically inspects the S-T buffer or when a read operation is invoked.

19. The system of claim 18 wherein the TC writes outputs to the T-S buffer and the SC periodically inspects and forwards outputs from the S-T buffer.

20. The system of claim 19 wherein the time deterministic software execution module is configured to structure memory access patterns such that a write of a time value to the T-S buffer during the play execution will produce the same memory access pattern as a read of the timing value from the S-T buffer during the replay execution.

21. The system of claim 13 wherein the time deterministic software execution module is configured to ensure that an initial machine state is the same for the play and replay executions.

22. The system of claim 17 wherein the time deterministic software execution module is configured to use the SC for I/O operations.

23. A non-transitory computer readable medium having stored thereon executable instructions that when executed by the processor of a computer control the computer to perform steps comprising:
recording inputs, timings of the inputs, outputs, and timings of outputs of a play execution of software S;
using the inputs and the timings of the inputs from the play execution perform a replay execution of a reference copy of software S and recording outputs and timings of outputs the replay execution, wherein the play execution of the software S is implemented on a virtual machine executing on timed processor core (TC), wherein the virtual machine receives calls from applications running on the virtual machine and sends the calls to a timed-supporting (T-S) buffer;
during the play execution of the software S, using a supporting processor core (SC) to handle interrupts and input/output (I/O) on behalf of the TC by reading the calls from the T-S buffer, performing the calls, and writing results of the calls to a supporting-timed (S-T) buffer, wherein the TC reads the results of the calls from the S-T buffer during the play execution;
wherein during the replay execution, the TC reads the inputs from the S-T buffer and writes the outputs to the T-S buffer; and
comparing the timings of the outputs of the play execution to the timings of outputs of the replay execution to determine whether the output of the play execution contains a covert timing channel.

* * * * *

UNITED STATES PATENT AND TRADEMARK OFFICE
CERTIFICATE OF CORRECTION

PATENT NO. : 10,437,993 B2
APPLICATION NO. : 15/514820
DATED : October 8, 2019
INVENTOR(S) : Chen et al.

Page 1 of 1

It is certified that error appears in the above-identified patent and that said Letters Patent is hereby corrected as shown below:

In the Specification

Column 1, Line 14:
Replace "This invention was made with government support under Grant Nos. CNS-1065130, CNS-1054229, CNS-1149832, CNS-1064986, CNS-1117185, CNS-1040672 awarded by the National Science Foundation, and Grant No. FA8650-11-C-7189 awarded by the Defense Advanced Research Projects Agency. The government has certain rights in the invention."
With -- This invention was made with government support under grant numbers CNS1065130, CNS1054229, CNS1149832, CNS1064986, CNS1117185 and CNS1040672 awarded by the National Science Foundation. The government has certain rights in the invention. --

Signed and Sealed this
Seventh Day of December, 2021

Drew Hirshfeld
*Performing the Functions and Duties of the
Under Secretary of Commerce for Intellectual Property and
Director of the United States Patent and Trademark Office*